United States Patent
Nylander et al.

(10) Patent No.: US 11,271,862 B2
(45) Date of Patent: Mar. 8, 2022

(54) SERVICE DELIVERY IN A COMMUNICATION NETWORK

(71) Applicant: Telefonaktiebolaget LM Ericsson (publ), Stockholm (SE)

(72) Inventors: Tomas Nylander, Varmdo (SE); Ann-Christine Eriksson, Enkoping (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 9 days.

(21) Appl. No.: 15/120,491

(22) PCT Filed: Feb. 21, 2014

(86) PCT No.: PCT/EP2014/053482
§ 371 (c)(1),
(2) Date: Aug. 19, 2016

(87) PCT Pub. No.: WO2015/124210
PCT Pub. Date: Aug. 27, 2015

(65) Prior Publication Data
US 2017/0012891 A1    Jan. 12, 2017

(51) Int. Cl.
  *G06F 15/16* (2006.01)
  *H04L 47/70* (2022.01)
  (Continued)

(52) U.S. Cl.
  CPC .............. *H04L 47/70* (2013.01); *H04L 47/25* (2013.01); *H04W 28/0231* (2013.01);
  (Continued)

(58) Field of Classification Search
  CPC ............. H04W 76/10; H04W 28/0231; H04W 28/0247; H04W 84/042; H04W 88/02;
  (Continued)

(56) References Cited

U.S. PATENT DOCUMENTS 8,111,630 B2* 2/2012 Kovvali .............. H04L 67/2861
                                                      370/252
8,265,140 B2* 9/2012 Mehrotra ............... H04N 19/61
                                                      375/240.02
(Continued)

FOREIGN PATENT DOCUMENTS

EP    2696552 A1    2/2014
JP    2004312569 A  11/2004
(Continued)

OTHER PUBLICATIONS

Notice of Reasons for Rejection from foreign counterpart Japanese Application No. 2016-552912, dated Dec. 6, 2017, 12 pages.
(Continued)

*Primary Examiner* — Vivek Srivastava
*Assistant Examiner* — Karina J Garcia-Ching
(74) *Attorney, Agent, or Firm* — NDWE LLP

(57) ABSTRACT

A method and apparatus for requesting service delivery of data in a communication network. A mobile device sends, to an interaction device, information relating to a service and requests information relating to a RAN to which the mobile device is attached. It receives the requested information from a remote device and uses the received information to establish a required service delivery parameter relating to delivery of the service from a server to the mobile device. It sends towards the server a request for data, the request including the established service delivery parameter, and receives from the server data sent using the service delivery parameter.

18 Claims, 12 Drawing Sheets

(51) Int. Cl.
*H04W 28/02* (2009.01)
*H04L 47/25* (2022.01)
*H04W 76/10* (2018.01)
*H04L 47/38* (2022.01)
*H04L 61/256* (2022.01)
*H04L 67/01* (2022.01)
*H04W 84/04* (2009.01)
*H04W 88/02* (2009.01)
*H04W 88/08* (2009.01)

(52) U.S. Cl.
CPC ....... *H04W 28/0247* (2013.01); *H04W 76/10* (2018.02); *H04L 47/38* (2013.01); *H04L 61/256* (2013.01); *H04L 67/42* (2013.01); *H04W 84/042* (2013.01); *H04W 88/02* (2013.01); *H04W 88/08* (2013.01)

(58) Field of Classification Search
CPC ........ H04W 88/08; H04L 47/25; H04L 47/70; H04L 47/38; H04L 61/256; H04L 67/42
USPC ........................................... 709/217
See application file for complete search history.

(56) References Cited

U.S. PATENT DOCUMENTS

| | | | | |
|---|---|---|---|---|
| 8,325,800 | B2* | 12/2012 | Holcomb | H04N 19/34 375/240.03 |
| 8,605,586 | B2* | 12/2013 | Park | H04W 36/22 370/230 |
| 8,825,875 | B2* | 9/2014 | Heidermark | H04L 69/24 709/227 |
| 9,386,058 | B2* | 7/2016 | Gao | H04L 65/604 |
| 9,392,539 | B2* | 7/2016 | Yeh | H04L 65/1016 |
| 9,560,392 | B2* | 1/2017 | Parekh | H04N 21/23424 |
| 9,674,100 | B2* | 6/2017 | Fu | H04L 47/29 |
| 9,722,936 | B2* | 8/2017 | Zhou | H04N 21/2401 |
| 10,314,015 | B2* | 6/2019 | Shan | H04W 28/22 |
| 2008/0130726 | A1* | 6/2008 | Sofer | H04W 28/22 375/220 |
| 2010/0146145 | A1* | 6/2010 | Tippin | H04N 21/23424 709/236 |
| 2010/0198946 | A1 | 8/2010 | Dowlatkhah et al. | |
| 2011/0188451 | A1* | 8/2011 | Song | H04W 36/0033 370/328 |
| 2012/0278833 | A1* | 11/2012 | Tam | H04N 21/2343 725/31 |
| 2012/0309397 | A1* | 12/2012 | Rao | H04W 8/00 455/437 |
| 2013/0042015 | A1* | 2/2013 | Begen | H04N 19/46 709/231 |
| 2013/0044801 | A1* | 2/2013 | Cote | H04N 19/146 375/240.01 |
| 2013/0157679 | A1* | 6/2013 | Van Phan | H04W 76/14 455/452.2 |
| 2013/0201824 | A1* | 8/2013 | Venkatachalam | H04W 28/0289 370/230 |
| 2013/0227106 | A1* | 8/2013 | Grinshpun | H04N 21/25825 709/223 |
| 2013/0332620 | A1* | 12/2013 | Gahm | H04N 21/23805 709/231 |
| 2014/0022900 | A1* | 1/2014 | Salot | H04W 28/0205 370/235 |
| 2014/0025830 | A1* | 1/2014 | Grinshpun | H04N 21/2662 709/227 |
| 2014/0036667 | A1* | 2/2014 | Balasubramanian | H04L 47/26 370/230 |
| 2014/0130115 | A1* | 5/2014 | Losev | H04L 65/607 725/116 |
| 2014/0254356 | A1* | 9/2014 | Jeong | H04L 47/20 370/229 |
| 2014/0254367 | A1* | 9/2014 | Jeong | H04L 47/803 370/233 |
| 2014/0293796 | A1* | 10/2014 | Jeong | H04M 15/66 370/236 |
| 2014/0366070 | A1* | 12/2014 | Lee | H04N 21/2402 725/62 |
| 2015/0032899 | A1* | 1/2015 | Willars | H04L 65/4076 709/231 |
| 2015/0085875 | A1* | 3/2015 | Phillips | H04L 65/601 370/465 |

FOREIGN PATENT DOCUMENTS

| | | |
|---|---|---|
| JP | 2005079909 A | 3/2005 |
| WO | 2013057315 A2 | 4/2013 |

OTHER PUBLICATIONS

International Preliminary Report on Patentability for Application No. PCT/EP2014/053482, dated May 19, 2016, 6 pages.
International Search Report for Application No. PCT/EP2014/053482, dated Nov. 13, 2014, 3 pages.
Extended European Search Report for Application No. EP19152537.7, dated May 9, 2019, 9 pages.
Notice of Reasons for Rejection from foreign counterpart Japanese Patent Application No. 2018-164618, dated Jul. 9, 2019, 7 pages.
Office Action and Search Report from foreign counterpart Chinese Patent Application No. 201480076037.0, dated Oct. 18, 2018, 8 pages (English-language summary of Office Action only).
Decision to Grant a Patent, JP App. No. 2016-552912, dated Jun. 27, 2018, 5 pages (2 pages of English Translation and 3 pages of Original Document).
Notification to Grant Patent Right for Invention, CN App. No. 201480076037.0, dated Jun. 12, 2019, 3 pages (2 pages of English Translation 1 page of Original Document).
Written Opinion of the International Search Authority for International Application No. PCT/EP2014/053482 dated Nov. 13, 2014, 6 pages.
Written Opinion of the International Preliminary Examining Authority for International Application No. PCT/EP2014/053482 dated Feb. 2, 2016, 5 pages.
Communication under Rule 71(3) EPC for Application No. EP14706550.2 dated Sep. 4, 2018, 86 pages.
Decision to Grant for Application No. EP14706550.2 dated Jan. 10, 2019, 2 pages.

\* cited by examiner

SERVICE DELIVERY IN A COMMUNICATION NETWORK

CROSS-REFERENCE TO RELATED APPLICATIONS

This application is a National stage of International Application No. PCT/EP2014/053482, filed Feb. 21, 2014, which is hereby incorporated by reference.

TECHNICAL FIELD

The invention relates to the field of optimizing service delivery in a communication network.

BACKGROUND

A mobile network is typically divided into different domains as illustrated in the exemplary communication network of FIG. 1. A mobile device 1 (termed herein a User Equipment, UE) is provided with an operating system 2, and for example, a web browser 3, App x 5, and App y 6. The Apps are software running or stored at the UE 1 that can request data services.

The UE 1 connects via an eNodeB (eNB) or Radio Network Controller (RNC) 7 to a mobile operator Radio Access Network (RAN) 7. The eNB and RNC are used by way of example only. It will be appreciated that any type of NodeB or network controller can be used depending on the Radio Access Technology (RAT) of the RAN 7. For example, in a Wi-Fi network the UE 1 (referred to as a Station in Wi-Fi) would connect via an Access Point (AP) and Access Controller (AC).

The mobile core network domain 8 includes mobile core nodes that link the RAN 7 to the service network 10. Examples of such nodes include a Serving Gateway (SGW), Packet Data Network Gateway (PGW) 8 and so on. The service network 10 includes functions such as a control plane function 11, a user plane function 12, and a Network Address Translation (NAT) function 13. Finally, user plane traffic reaches servers 14, 15 in the Internet 16 domain.

User plane traffic can be sent between App x 4 and its corresponding server 14, and between App y 5 and its corresponding server 15. Examples of servers are cache servers, video servers, web server, analytics servers and so on. It will be appreciated that many different types and combinations of servers can be used to provide services to Apps at the UE 1. Signalling between the servers 14, 15 and the Apps 4, 5 traverses the RAN 7, the Core network 9 and the service network 10.

There is a current desire to more closely link RAN 7 and service functionality together in order to optimize service delivery and radio resource usage. For example, data packets sent from a server 14 could be delayed if the RAN 7 is currently congested and experiencing delays. Access specific information is therefore useful for the server 14. It is also possible that the RAN 7 can make use of information relating to the server 14. Such information could be used, for example, for resource reservation.

One example where data destined for App x 4 and App y 5 in the UE 1 is an Adaptive Bit Rate feature. In this example, App x 4 is a video client which can decode video at different bit rates. End user experience or Quality of Experience (QoE) is a key differentiator for mobile operators and content providers. Adaptive Bit Rate allows a good QoE by adapting the bit rate by changing to an encoded format with a suitable bit rate depending on network conditions. Currently this is achieved by trying to estimating the throughput between the server 14 and App x 4 in the UE 1. This can be based on a measured link bit rate or round trip time. The frequency of adapting the bit rate varies. A typical interval for adaptive video streaming is around every 4 seconds.

Adaptive Bit Rate is implemented without any knowledge of conditions or capabilities of the RAN 7. Estimates of round trip time (RTT), bit rate and so on can give a misleading picture of conditions in the RAN 7. Furthermore, it takes some time for the end points to detect that there is a need to adapt to a lower or higher bit rate, and the interval between adaptations change is fairly long. This increases the risk of a poor QoE.

While the above example refers to adaptive bit rate for video services, it will be appreciated that similar issues arrive when delivering data services of any sort. For example, in order to improve QoE when delivering services in a congested network, an image could be sent at a lower resolution, an audio stream could be sent at a lower quality, a video could be sent using smaller frames. It will be appreciated that many service delivery parameters can be changed to optimize the service delivery, depending on the nature of the data being delivered.

There are initiatives to improve QoE by having RAN interaction with the service providers. In the above example network, there might be interaction between the RAN 7 and the servers 14, 15 to exchange and provide information to optimize the service delivery. Difficulties in implementing this include addressing problems, since no common identifier is easily available between the RAN 7 and the servers 14, 15, mainly due to the use of Network Address Translation (NAT) which modifies the UE IP address and disqualifies that identifier. Also there are scalability issues, as a server 14 may see connections from several hundred mobile networks, so it not trivial to determine the identity of the RAN with which network to establish a session for interaction and if the RAN supports the feature. Also it might be difficult to modify servers 14, 15 to use such an interaction protocol and to use information received from a RAN 7. Furthermore, not all protocols support adaptation such as adaptive bit rate.

SUMMARY

It is an object to improve the QoE of an end user by optimizing service delivery of data to a UE.

According to a first aspect, there is provided a method of requesting service delivery of data in a communication network A mobile device sends, to an interaction device, relating to a service and requesting information relating to a RAN to which the mobile device is attached. It receives the requested information from a remote device and uses the received information to establish a required service delivery parameter relating to delivery of the service from a server to the mobile device. It sends towards the server a request for data, the request including the established service delivery parameter, and receives from the server data sent using the service delivery parameter. An advantage of this is that the service aware parameter is sent by the mobile device to improve the end-user's QoE by, for example, dynamically adjusting data content when network conditions deteriorate.

As an option, the information relating to the RAN comprises any of the required service delivery parameter itself, capabilities of the communication network, and conditions in the communication network.

Optional examples of service delivery parameter includes any of a recommended frame size, a recommended bit rate, a recommended image resolution, a recommended image size, and buffer parameters. Of course, other parameters may be used depending on the nature of the service.

The received information is optionally handled by an Interaction client at the mobile device, and then passed to an application client at the mobile device, the application client arranged to handle the received data.

The remote device is optionally the interaction device. The information relating to the RAN is optionally received by the mobile device using any of a protocol based on any of HTTP and Websocket, and a protocol using any of User Datagram Protocol and Transmission Control Protocol as a transport mechanism.

As an alternative option, the remote device is located at a device in the Radio Access Network.

The information relating to the Radio Access Network comprises injected data into user plane signalling received from the device in the Radio Access Network.

As an option, the mobile device receives the requested information periodically or in response to a further request sent by the mobile device.

According to a second aspect, there is provided a method of controlling service delivery of data in a communication network. An interaction device receives from a mobile device information relating to a service and a request for information relating to a RAN to which the mobile device is attached. The interaction device sends to a remote device in the RAN a message, the message including the information relating to the service. It then receives from the remote device a recommended service delivery parameter relating to delivery of the service from a server and sends the recommended service delivery parameter towards the mobile device.

According to a third aspect, there is provided a method of controlling service delivery of data in a communication network. An interaction device receives from a mobile device information relating to a service and a request for information relating to a RAN to which the mobile device is attached. It then sends to a remote device in the RAN an instruction to generate a recommended service delivery parameter relating to delivery of the service from a server to the mobile device and send the recommended service delivery parameter towards the mobile device.

As an option for either of the second or third aspects, the service delivery parameter includes any of a recommended frame size, a recommended bit rate, a recommended image resolution, a recommended image size, and buffer parameters.

According to a fourth aspect, there is provided a method of providing a recommendation for a service delivery parameter for delivery of a data service from a server to a mobile device. A recommendation device in a RAN to which the mobile device is attached receives from an interaction device information relating to a service associated with the mobile device and a request to provide a recommendation for a service delivery parameter. It determines a recommended service delivery parameter and sends to either the interaction device or the mobile device the determined recommended service delivery parameter, the service delivery parameter being usable by the mobile device when requesting data from the server.

As an option, the request includes information identifying a type of service to be delivered, and a type of service delivery parameter requested.

The recommended service delivery parameter is optionally determined based on any of cell load information, mobile device performance information, mobile device radio quality information, prediction of future cell load, and an estimation of mobile device data capacity in a future time period.

According to a fifth aspect, there is provided a mobile device for use in a communication network. The mobile device is provided with a transmitter arranged to send to an interaction device information relating to a service and requesting information relating to a RAN to which the mobile device is attached. A receiver is provided, arranged to receive from a remote device the requested information. A processor is provided, arranged to use the received information to establish a required service delivery parameter relating to delivery of the service from a server to the mobile device. A second transmitter is arranged to send towards the server a request for data, the request including the established service delivery parameter. A second receiver is provided, arranged to receive from the server data sent using the service delivery parameter.

As an option, the mobile device is provided with an interaction client arranged to handle the received information.

According to a sixth aspect, there is provided an interaction device for use in controlling service delivery of data in a communication network. The interaction device is provided with a first receiver arranged to receive from a mobile device information relating to a service and a request for information relating to a RAN to which the mobile device is attached. A first transmitter is provided, arranged to send to a remote device in the RAN a message, the message including the information relating to the service. A second receiver is provided, arranged to receive from the remote device a recommended service delivery parameter relating to delivery of the service from a server to the mobile device. A second transmitter is provided, arranged to send the recommended service delivery parameter towards the mobile device.

According to a seventh aspect, there is provided an interaction device for use in controlling service delivery of data in a communication network. The interaction device comprises a receiver arranged to receive from a mobile device information relating to a service and a request for information relating to a Radio Access Network to which the mobile device is attached. A transmitter is also provided, arranged to send to a remote device in the RAN an instruction to generate a recommended service delivery parameter relating to delivery of the service from a server to the mobile device and send the recommended service delivery parameter towards the mobile device.

According to an eighth aspect, there is provided a recommendation device arranged to provide a recommendation for a service delivery parameter for delivery of a data service from a server to a mobile device, the recommendation device being located in a RAN to which the mobile device is attached and comprising a receiver arranged to receive from an interaction device information relating to a service associated with the mobile device and a request to provide a recommendation for a service delivery parameter. A processor is also provided, arranged to determine a recommended service delivery parameter. A transmitter is provided, arranged to send to any of the interaction device and the mobile device the determined recommended service delivery parameter, the service delivery parameter being usable by the mobile device when requesting data from the server.

According to a ninth aspect, there is provided a computer program, comprising instructions which, when executed on at least one processor, cause the at least one processor to carry out any of the methods described above in any of the first to fourth aspects.

According to a tenth aspect, there is provided a carrier containing the computer program of described above in the ninth aspect, wherein the carrier is one of an electronic signal, optical signal, radio signal, or non-transitory computer readable storage medium.

DETAILED DESCRIPTION

The following description refers to a UE 1, but it will be appreciated that the same principles apply to any device that connects to a communication network via a Radio Access Network (RAN), and regardless of the Radio Access Technology (RAT) used. Furthermore, the following description uses the example of adjusting a bit rate for delivery of video services according to recommendations made depending on conditions and/or capabilities of the RAN. It will be appreciated that any type of service delivery parameter may be adjusted to optimize delivery of a service and thereby enhance the QoE for the end user.

Figure 1:
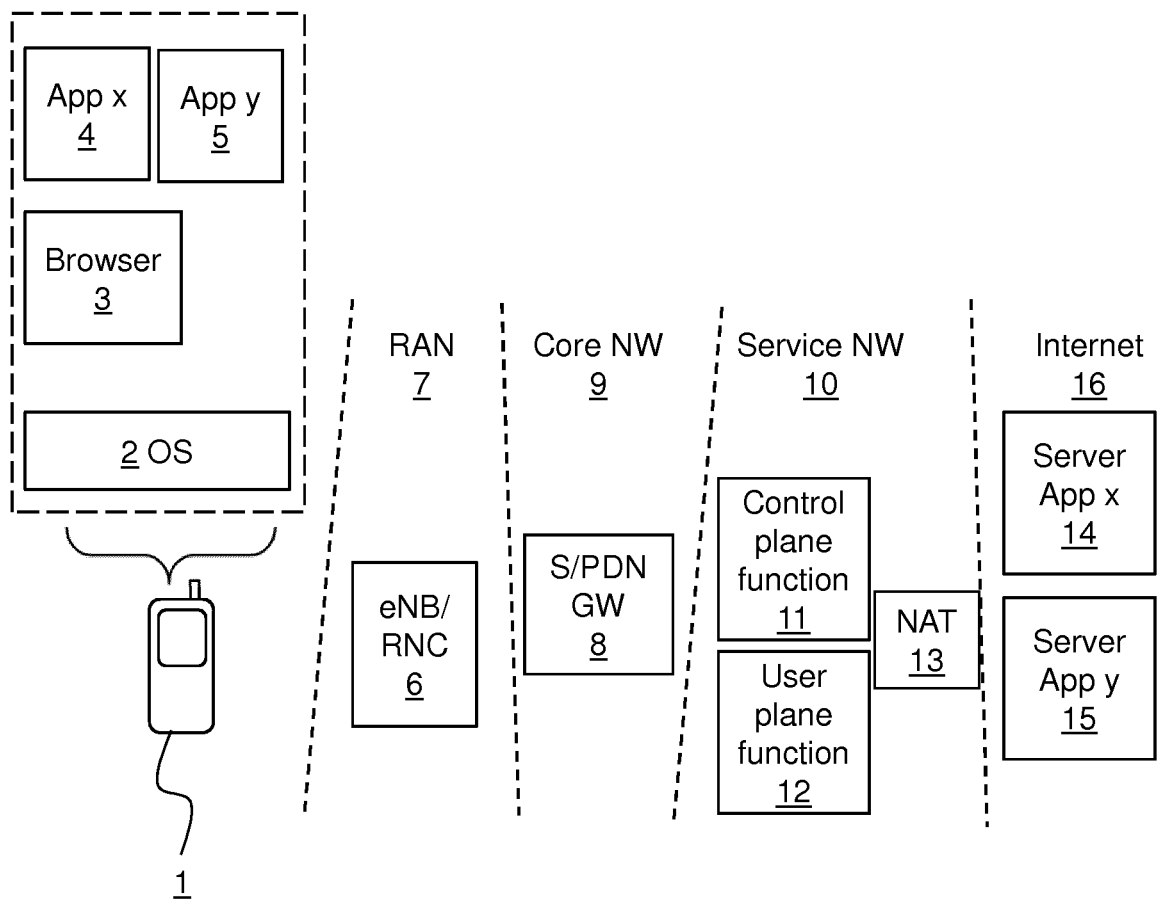
FIG. 1 illustrates schematically in a block diagram a known exemplary mobile network.
Figure 2:
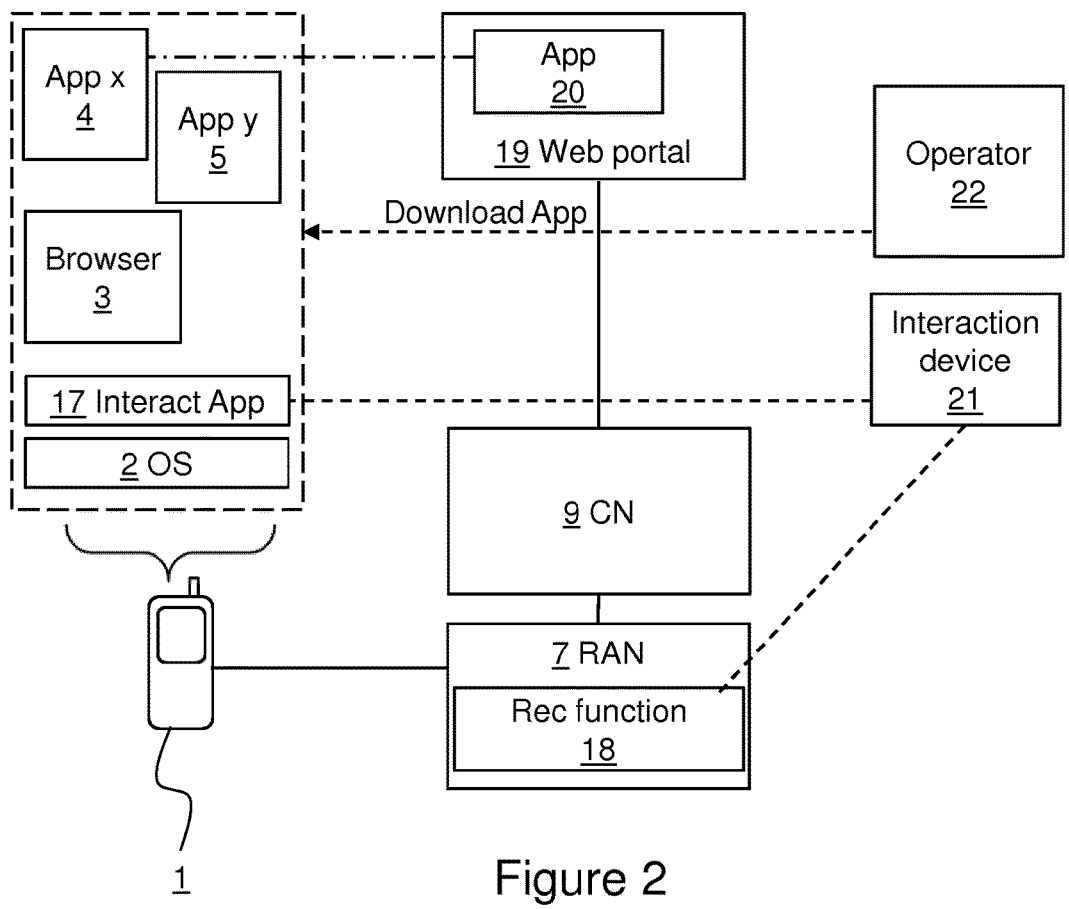
FIG. 2 illustrates schematically in a block diagram an exemplary mobile network.

FIG. 2 illustrates schematically an exemplary network using a RAN. A UE 1 has an interaction client 17 (shown as Interaction App in FIG. 2) to allow the UE 1 to obtain and use service delivery parameters. The UE 1 connects to the RAN 7. The RAN includes a recommendation function 18. In this example, a web portal 19 provides a service in which data is provided from App 20 to App x 4 at the UE 1. An interaction device 21 is located in the network, which communicated with the interaction client 17. The interaction client 17 may be provided by an operator 22.

The interaction client 17 is shown as a standalone client, but it will be appreciated that it could alternatively be implemented as a web browser plugin or part of the UE Operating System 2 or part of an existing App. In an exemplary embodiment, the interaction device 21 informs the UE 1 about appropriate recommendations for service delivery parameters depending on, for example, conditions and capabilities of the RAN 7. This allows the UE to use the recommended service delivery parameters when requesting data from a server.

For example, if the web portal 19 is providing a streaming video service from the App 20 to App x 4 at the UE 1, the service delivery parameter might be an optimum bit rate. The recommendation function 18 provides a recommended optimum bit rate to the interaction device 21, which in turn provides the recommended optimum bit rate to the UE 1. When App x 4 requests a video segment, it includes the recommended optimum bit rate in the request, and the App 20 provides the video using the recommended optimum bit rate. The recommended optimum bit rate may change dynamically over time depending on conditions in the RAN 7, allowing the streaming video service to be maintained even in circumstances where conditions on the RAN 7 deteriorate. This ensures a consistent QoE for the end-user.

While bit rate adaptation is used as an example throughout, it will be appreciate that other types of service delivery parameter may be used depending on the type of service. For example, a degree of compression for streaming audio may be dynamically adapted, video resolution may be dynamically adapted, or recommendations about client buffer size may be made. Any type of content adaptation may be used where the UE 1 requests delivery of the content in a suitable format/resolution depending on the recommended service delivery parameter. The type of service delivery parameter is determined when the UE 1 sends information to the interaction device 21. Sent information may include, for example, an indication that adaptive video is possible, supported media rates, duration of each media segment, buffer capabilities and so on, allowing the interaction device 21 to ensure that only relevant information is provided to the UE 1.

Figure 3:
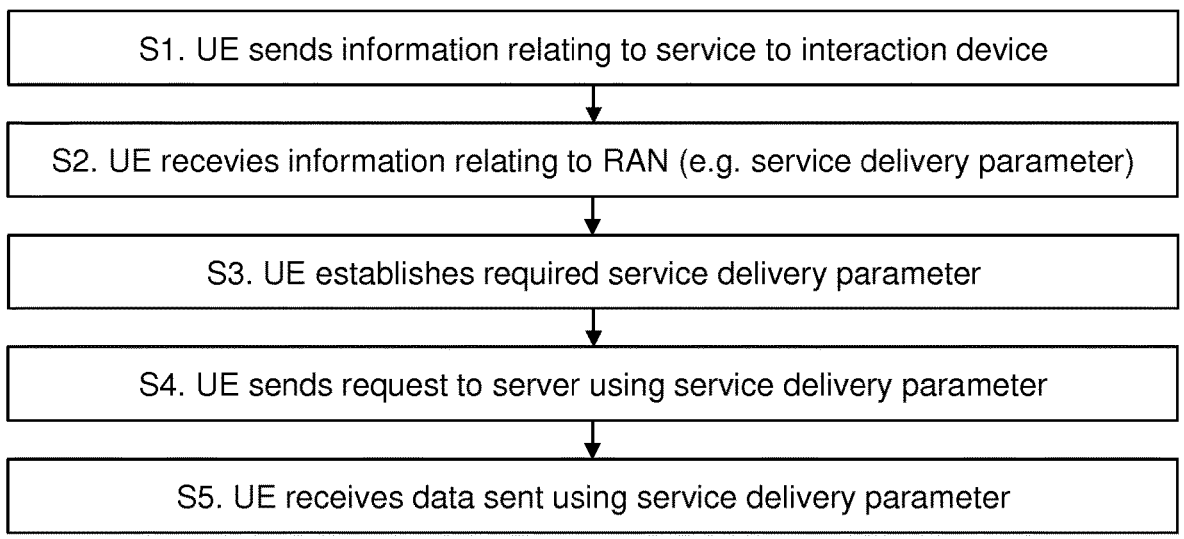
FIG. 3 is a flow diagram showing exemplary steps.

FIG. 3 is a flow diagram showing exemplary steps. The following numbering corresponds to that of FIG. 3:

S1. The UE 1 is connected to the RAN 7 and establishes a session with the interaction device 21. During session establishment, the UE 1 provides the interaction device 21 with information relating to the service that the UE 1 is (or will be) using. This may be an indication of the type of service, or the type of service delivery parameter for which a recommendation or other information is required. For example, the UE 1 may inform the interaction device 21 that it requires service delivery parameter for adaptive video and inform the interaction device 21 of any restrictions on the adaptive video (supported media rates, duration of media segments etc.).

S2. The UE receives information relating to the RAN from a remote node. The remote node may be the interaction device 21 or a node/function in the RAN. The information may be a recommended service delivery parameter or information usable by the UE to derive a recommended service delivery parameter. If network operator control is desirable then it is preferred to send the recommended service delivery parameter to the UE rather than information from which the UE 1 can derive the recommended service delivery parameter.

S3. The UE 1 establishes the service delivery parameter (either by using the information received in step S2 or by deriving it from information received in step S2).

S4. The UE 1 sends a request to the server 14 for data, the request including the service delivery parameter.

S5. The server uses the received service delivery parameter to, if necessary, adapt the requested data before sending it to the UE 1.

Consider an example in which the UE 1 requests video from a server and wishes to dynamically adjust the bit rate depending on conditions in the RAN 7. The interaction device 21 communicates bit rate recommendations to the UE and also communicates with a node in the RAN 7.

The UE 1 obtains an App 17 (or plugin) that enables communication with the interaction device 21. The App 17 may be obtained from operator's web site 22 or could be functionality included in the OS 2. The address/URL to use towards the interaction device may be provided in several ways, e.g. provided with the operator specific plugin/App, or a configuration SMS from the operator, etc. A session is then set up between the UE 1 and the interaction device 21. The UE 1 requests a recommendation for service delivery, where information about the service, e.g. bit rate capabilities, and the required duration of the recommendation are provided to the interaction device 21.

The interaction device 21 communicates with a recommendation function 18 in the RAN 7. It provides the service information applicable for the service/application in the UE 1 and the service delivery parameter required for the UE 1 (in this case, bit rate). The recommendation function uses various factors to derive the recommended bit rate before providing it to the interaction device 21. Examples of such factors are cell load information, mobile device performance information (bit rate, latency and so on), mobile device radio quality information, traffic generated by other UEs in the cell, quality of service and so on. The information is collected from previous time periods, and used to make a prediction (such as expected traffic load, UE radio quality and so on) to/estimate of mobile device data capacity in a future time period. For example, a decision may take into account that the recommended bit rate is the highest bit rate the application is capable of handling, even if it is lower than the available bit rate estimated for the next coming period.

The interaction device 21 provides the recommended bit rate to the UE 1. A first initial recommendation may be provided, followed by dynamic updates of the recommendation when the conditions/capabilities of the RAN 7 change. Alternatively the UE 1 may request a recommendation just before a recommendation is required to ensure that the UE 1 has a recommendation based on the most recent conditions/capabilities of the RAN 7. The UE passes the recommendation to its media Application App x 4, which uses the bit rate recommendation to request the next media segment in a suitable media bit rate.

In the above example, the recommended bit rate is derived at the recommendation function 18. Note, however, that the recommendation function 18 may alternatively provide information about conditions in the RAN 7 to the interaction device 21. The interaction device 21 can then derive the recommended bit rate before forwarding it to the UE 1. Alternatively, the interaction device can forward the information about conditions in the RAN 7 to the UE 1, allowing the UE 1 to derive the recommended bit rate.

Figure 4:
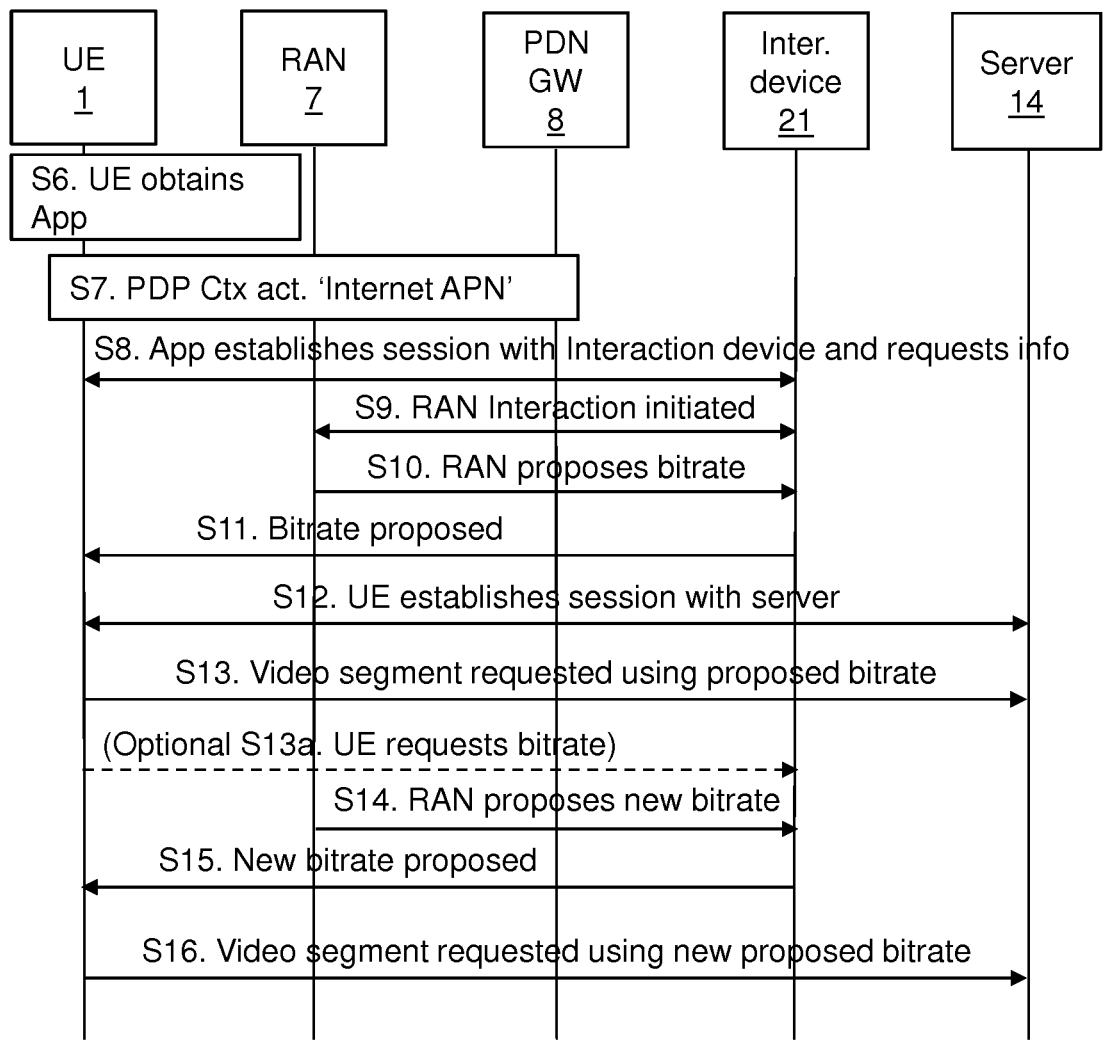
FIG. 4 is a signalling diagram showing exemplary steps when sending RAN interaction information via the UE.

FIG. 4 is a signalling diagram showing exemplary signalling for the embodiment described above. The following numbering corresponds to that of FIG. 4:

S6. The UE 1 obtains a plugin or App that enables communication with the interaction device 21. As described above, this may be existing functionality in the OS 2.

S7. The UE 1 activates a packet data connection.

S8. The UE 1 initiates a session with the interaction device 21. The address/URL to use towards the interaction device 21 could be provided in several ways, e.g. provided with the operator specific plugin/App, or a configuration SMS, etc. The communications between the UE 1 and the interaction device may use a new protocol running over User Datagram Protocol (UDP) or TCP (Transmission Control Protocol). This protocol can be used to inform the interaction device 21 about which bit rate formats the video is available in, and the interval for which the bit rate can be changed. The protocol can also be used to request information about a suitable bit rate, and to provide the UE 1 with information about when it can/should use a new bit rate. This step could be performed before or after step S11, for example if a video App is started, then it is known that the data service is video, whereas if the App is a browser, then likely step S11 would likely be performed before step S9, for example when a user clicks on a video link in the browser. During session establishment, the UE 1 provides the interaction device 21 with information relating to the service that the UE 1 is (or will be) using. This may be an indication of the type of service, or the type of service delivery parameter for which a recommendation or other information is required. For example, the UE 1 may inform the interaction device 21 that it requires service delivery parameter for adaptive video and inform the interaction device 21 of any restrictions on the adaptive video (supported media rates, duration of media segments etc.).

S9. Interaction is initiated between the interaction device 21 and the RAN 7, in which the interaction device 21 sends a message that includes information relating to the service and/or requesting the type of service delivery parameter required.

S10. The RAN 7 determines a recommended bit rate depending on conditions in the RAN and sends the recommended bit rate to the interaction device 21.

S11. The interaction device 21 sends the recommended bit rate to the UE 1, e.g. by sending an IP packet towards the UE using a new protocol.

S12. The UE 1 establishes a session with the video server 14.

S13. The UE 1 uses received information about the recommended bit rate in a request for a video segment. The server can then send the requested video segment at the recommended bit rate when.

S13a. In an optional embodiment, the UE 1 requests the recommended bit rate from the interaction device to ensure that it has a recommended bit rate based on the most recent information about conditions in the RAN 7.

S14. After a certain time period, or when the RAN 7 detects that a new bit rate would be more suitable, it informs the interaction device 21 of a new recommended bit rate. This may be triggered, for example, by a subscription type of request in step S9 where the interaction gateway requests a new bit rate each time a new bit rate would be suitable, or when the UE 1 requests an update. bit rate S15. The interaction gateway informs the UE 1 of the new recommended bit rate.

S16. The UE 1 uses received information about the new recommended bit rate in a further request for a video segment. The server can send the requested video segment at the recommended bit rate.

The general embodiment described above does not describe how communication between the UE 1 and the interaction device is sent. It is possible to send such communications via the Internet. However, this can lead to problems with, for example, NAT leading to issues of common identifiers. To address this, it is possible to introduce direct communication between the UE 1 and the interaction device 21 using a new interface and protocol, allowing the UE 1 and the interaction device 21 to exchange information. However, the basic principle of the UE 1 receiving a required service delivery parameter (such as bit rate) or information about the RAN from which a required service delivery parameter can be generated, are the same.

Figure 5:
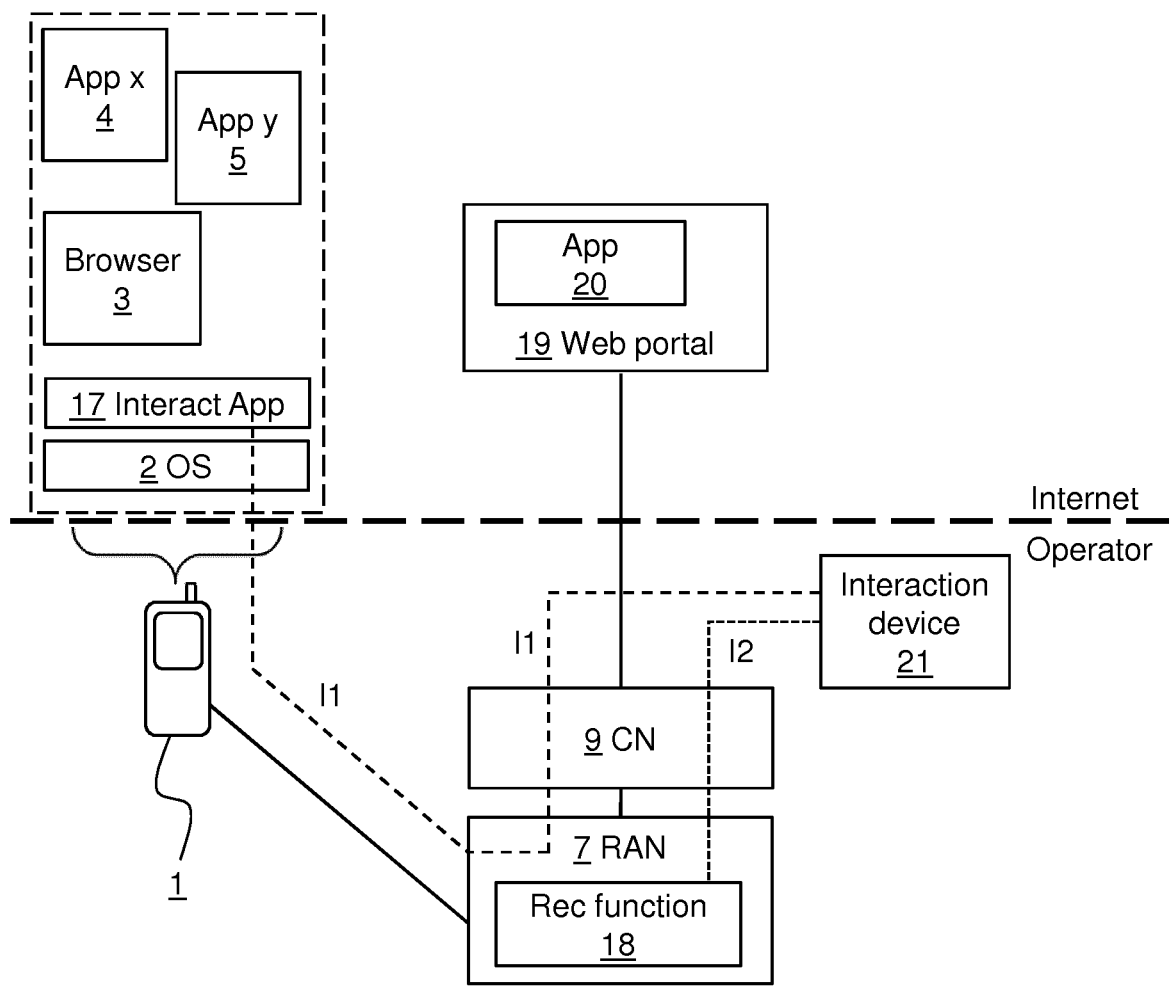
FIG. 5 illustrates schematically in a block diagram a second exemplary mobile network.

FIG. 5 shows a second embodiment in which a first interface (termed I1) is provided between the interaction device 21 and the UE 1, and a second interface (termed I2) is provided between the interaction device 21 and the recommendation function 18 in the RAN 7. The I2 interface is used for the recommendation function to provide the recommended bit rate (or other service delivery parameter) to the interaction device 21.

Figure 6:
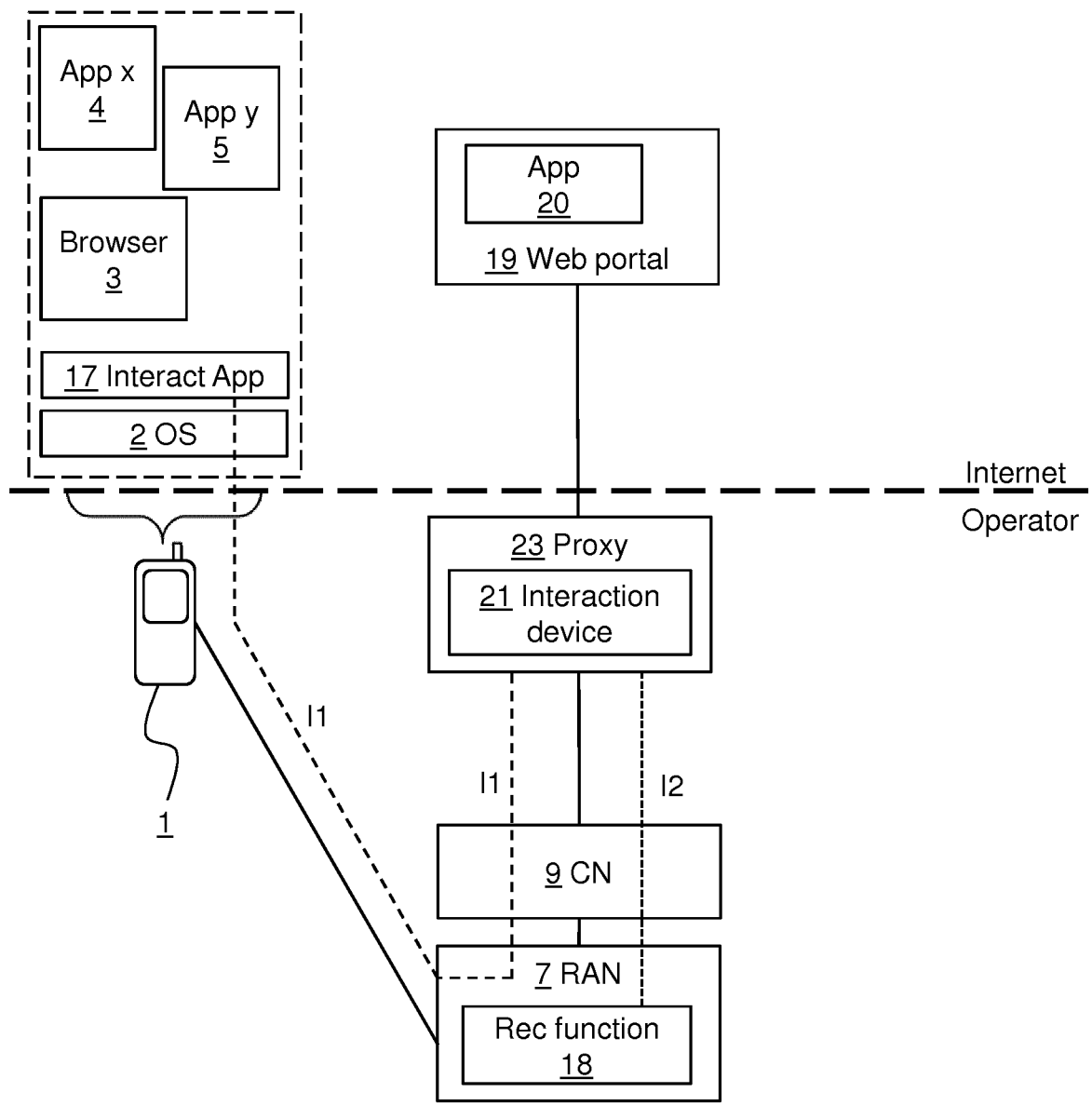
FIG. 6 illustrates schematically in a block diagram a third exemplary mobile network.

In the third embodiment shown in FIG. 6, the interaction device 21 is disposed at a proxy 23, which could further be integrated with a CN gateway or co-located with a CN gateway. Again, an I1 interface is provided between the UE 1 and the interaction device 21 and an I2 interface is provided between the interaction device 21 and the recommendation function 18 in the RAN 7.

Figure 7:
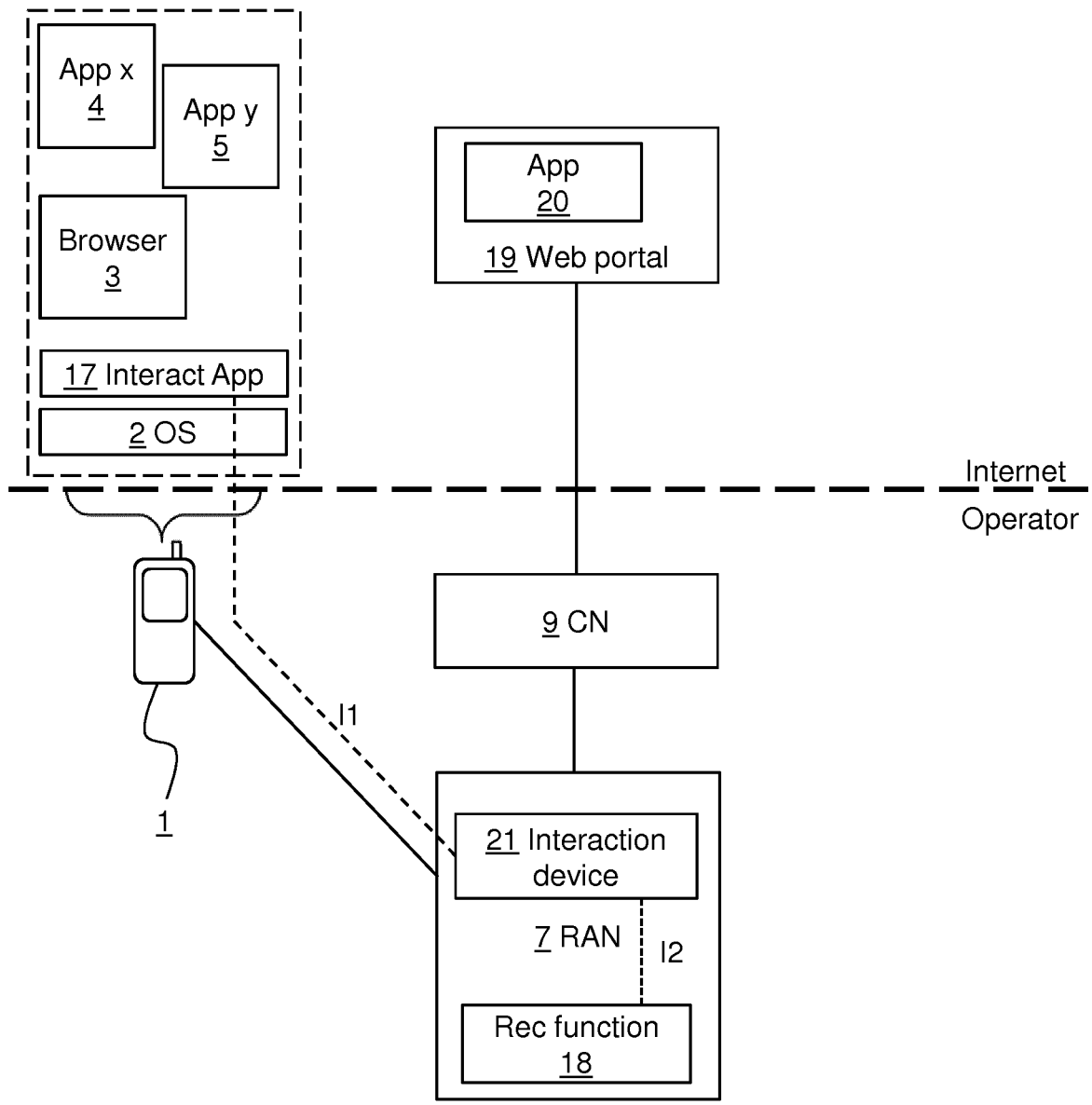
FIG. 7 illustrates schematically in a block diagram a fourth exemplary mobile network.

In the fourth embodiment shown in FIG. 7, the interaction device 21 is integrated in the RAN 7. Again, an I1 interface is provided between the UE 1 and the interaction device 21 and an I2 interface is provided between the interaction device 21 and the recommendation function 18 in the RAN 7.

Figure 8A:
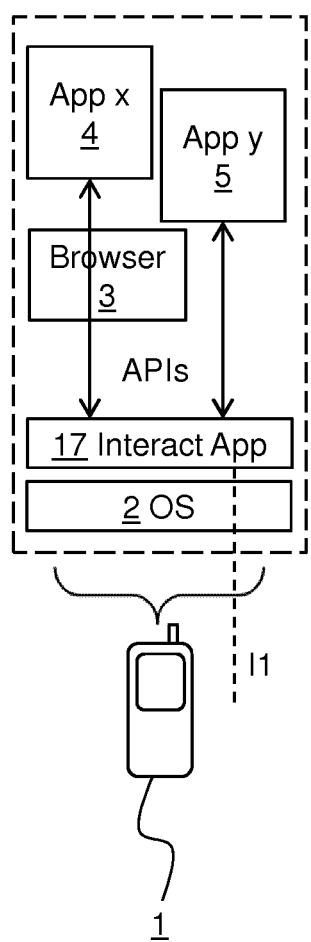
FIGS. 8a, 8b and 8c illustrate schematically in block diagrams exemplary UEs.
Figure 8B:
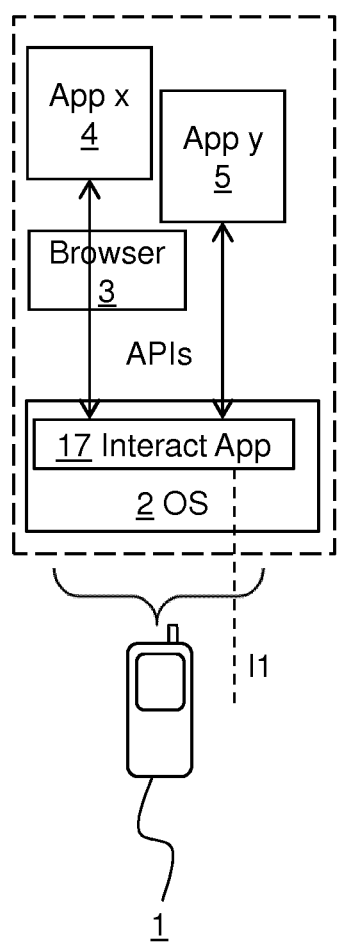
Figure 8C:
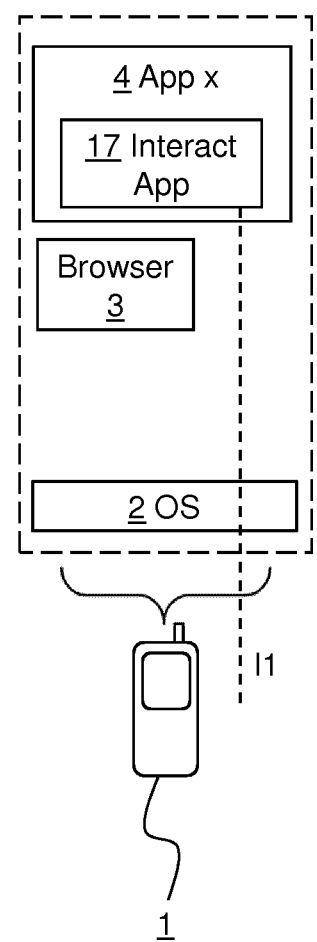

As mentioned above, the interaction client 17 at the UE can be provided as a standalone application (as shown in FIG. 8*a*) or be part of the OS 2, as shown in FIG. 8*b*, or integrated in existing Apps as shown in FIG. 8*c*.

Figure 9:
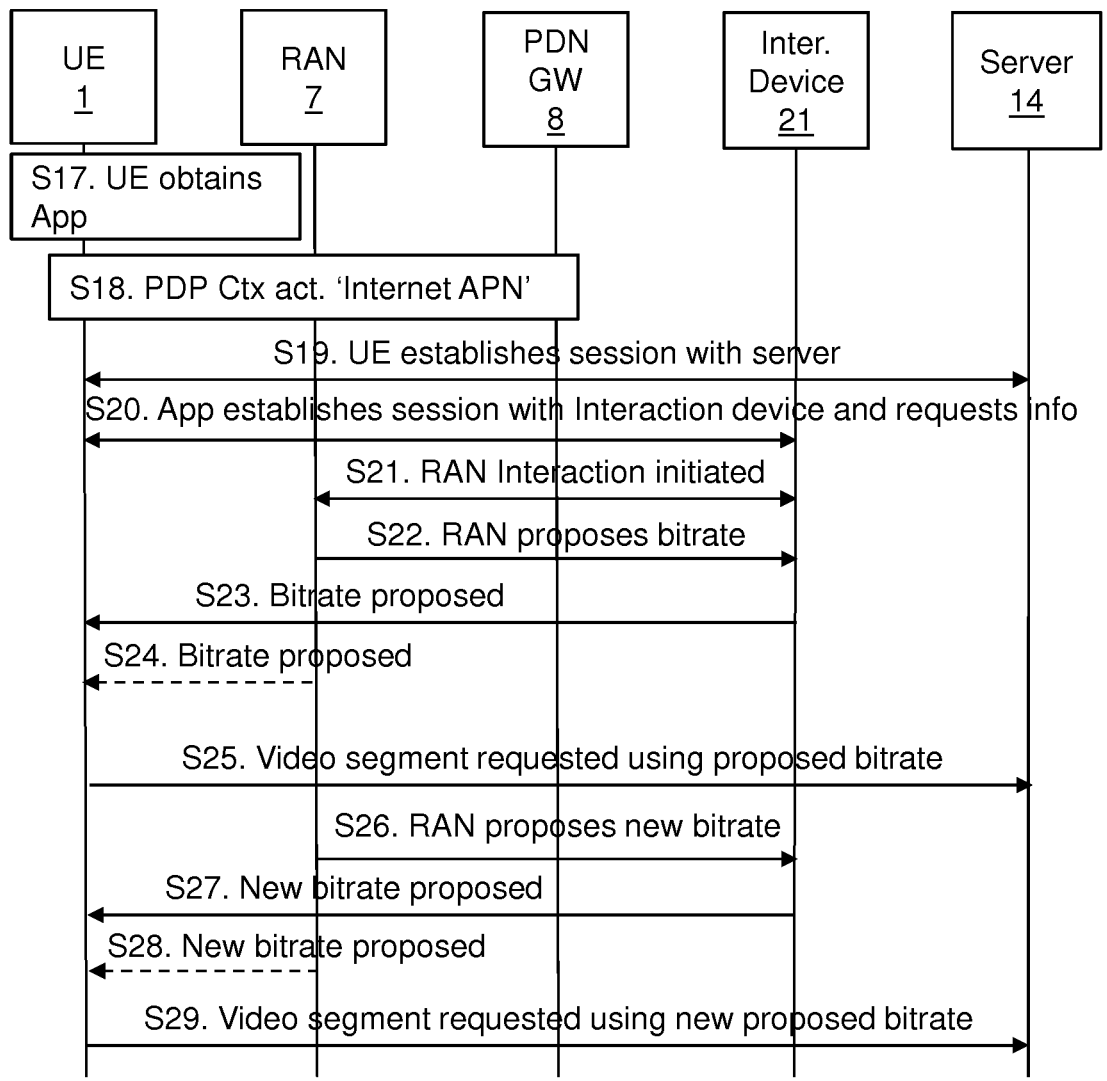
FIG. 9 is a signalling diagram showing exemplary steps when sending RAN interaction information via the UE.

FIG. 9 is a signalling diagram showing exemplary signalling where the service delivery parameter is a bit rate. It is compatible with any of the architectures shown in FIG. 5, 6 or 7. The following numbering corresponds to that of FIG. 9:

S17. The UE 1 obtains a plugin or App that enables communication with the interaction device 21. As described above, this may be existing functionality in the OS S18. The UE 1 activates a packet data connection.

S19. UE 1 establishes a session with the server 14.

S20. A communication channel is initiated between the UE 1 and the interaction device 21. The protocol used may be a new protocol using UDP or TCP as a transport layer. The new protocol could be, for example, based on existing protocols such as HTTP, Websocket or other suitable protocols, or may be a new dedicated protocol. This protocol can, in this example, be used to inform the network about support for this new protocol, ports used, which bit rate formats the video is available in and the interval for which the video can be changed. It can also provide service information to the RAN 7. The protocol can also be used to request information about a suitable bit rate, and to provide the UE 1 with information about when it can/should use a new bit rate. This step could be performed before or after step S19. For example, if a video App is started, then it is known that there will be streaming video, so step S20 could be executed simultaneously or before the video server is contacted. If the user is using a browser with embedded video, then step S20 would most likely be performed when the user clicks on a video link. The entity in the UE 1 that supports this functionality (e.g. an App, browser or Operating System (OS)) initiates a connection to the interaction device 1. The address/URL to use towards the interaction device 1 may be provided in several ways, e.g. provided with the operator specific plugin/App, or a configuration SMS, etc. During session establishment, the UE 1 provides the interaction device 21 with information relating to the service that the UE 1 is (or will be) using. This may be an indication of the type of service, or the type of service delivery parameter for which a recommendation or other information is required. For example, the UE 1 may inform the interaction device 21 that it requires service delivery parameter for adaptive video and inform the interaction device 21 of any restrictions on the adaptive video (supported media rates, duration of media segments etc.).

S21. As the knowledge about suitable bit rates is available in the RAN 7, the functionality to obtain this information from the RAN 7 is triggered.

S22. The RAN 7 informs the interaction device 21 about a recommended bit rate.

S23. The interaction device 21 informs the UE 1 of the recommended bit rate, e.g. by sending an IP packet towards the UE using a new protocol.

S24. As an alternative to steps S22 and S23, the RAN 7 could send this information packet directly towards the UE, for example by inserting the information onto user plane traffic. This speeds up the communication.

S25. The UE 1 uses the received recommended bit rate in a request for a video segment sent towards the server 14. The server 14 then sends the requested video segment towards the UE 1 using the recommended bit rate.

S26. When the RAN 7 detects that a new bit rate should be recommended, it informs the interaction gateway of the new recommended bit rate. This could be sent periodically, or in step S21 the interaction device 21 could subscribe to changes in the recommended bit rate.

S27. The interaction device 21 sends the new recommended bit rate to the UE 1 using the I1 interface.

S28. As an alternative to steps S26 and S27, the RAN 7 may inject this information packet directly towards the UE, for example by piggybacking the information onto user plane traffic. This speeds up the communication.

S29. The UE uses received information about appropriate bit rate in the request for next video segment.

Figure 10:
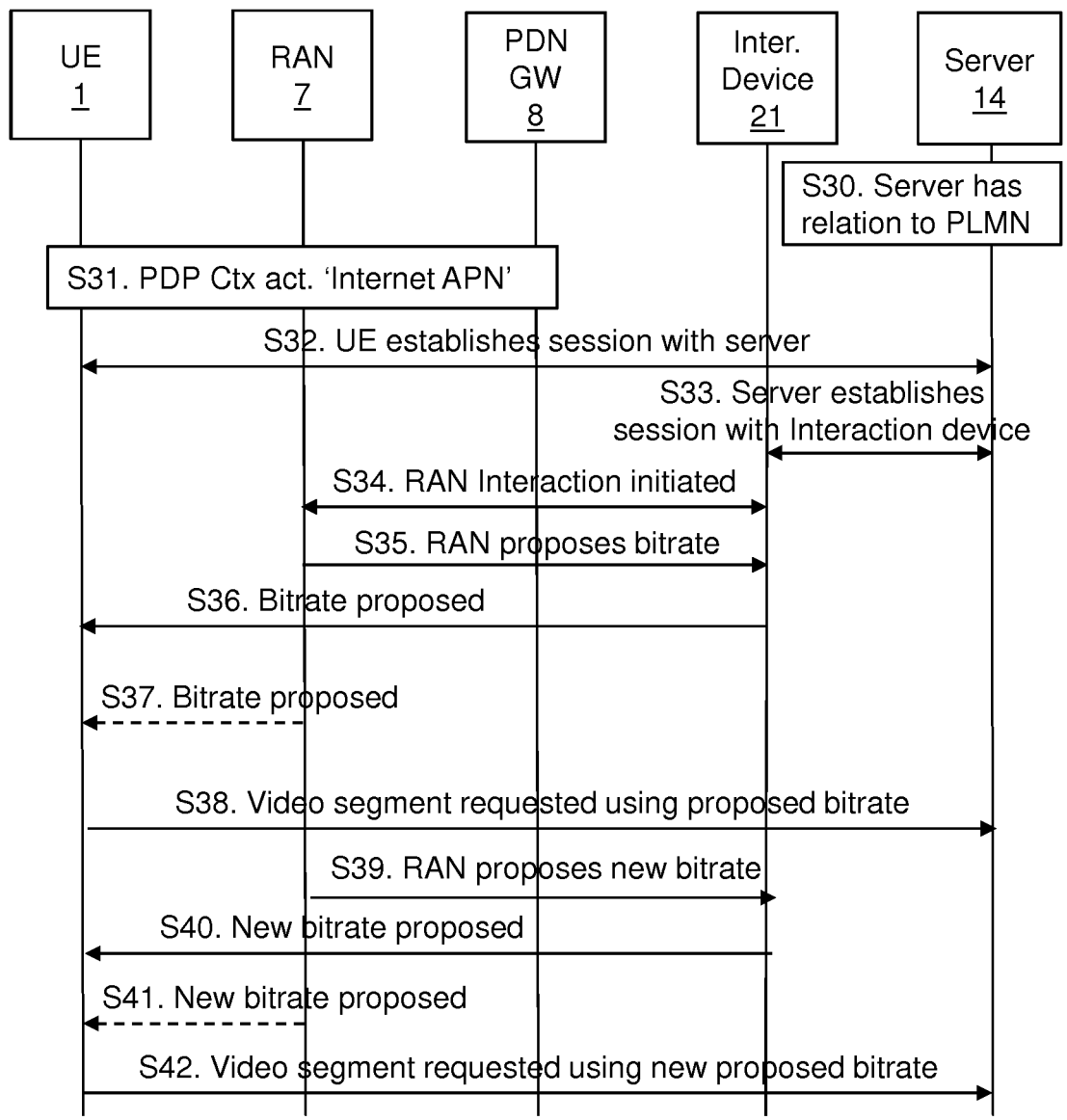
FIG. 10 is a signalling diagram showing exemplary steps when sending RAN interaction information via the UE.

FIG. 10 is a signalling diagram showing alternative exemplary signalling where the service delivery parameter is a bit rate. It is compatible with any of the architectures shown in FIG. 5, 6 or 7. The skilled person will realise that variants to this signalling diagram are possible. For example, all communication could be sent via the server 14, or some signalling could be optimized by sending it directly between the UE 1 and the interaction device 21. The following numbering corresponds to that of FIG. 10:

S30. The server 14 has an agreement with the mobile operator and communicates with the mobile network via a gateway. This allows the server 14 to, for example, inform the interaction device 21 that the UE supports direct communications, or to authenticate the server 14 and its right to participate in signalling relating to service delivery parameters.

S31. The UE 1 activates a packet data connection.

S32. The UE 1 establishes a session with the server 14. In this session the UE 1 may indicate that it supports the new signalling protocol with the interaction device 21, for example by conveying additional information using in HTTP.

S33. The server 14 establishes a session with the interaction device 21. The server 14 provides information that the UE 1 supports the new protocol. The information provided by the server 14 may also include a port the UE 1 has opened for communication in the case this protocol is initiated from the network. If not, the new protocol may use for example a default port number.

S34. Since the knowledge about suitable bit rates is available in the RAN 7, the functionality to handle this in the RAN 7 is triggered.

S35. The RAN 7 sends a recommended bit rate to the interaction device

S36. The interaction device 21 informs the UE 1 of the recommended bit rate using the I1 interface. This protocol may use UDP or TCP on the transport level.

S37. As an alternative to steps S35 and S36, the information sent towards the UE 1 may be injected at the RAN 7, speeding up the communication.

S38. The UE 1 uses the received recommended bit rate in a request for a video segment sent to the server 14. The server 14 sends the video segment using the recommended bit rate.

S39. When the RAN 7 detects that a new bit rate should be recommended, it informs the interaction gateway of the new recommended bit rate. This could be sent periodically, or in step S34 the interaction device 21 could subscribe to changes in the recommended bit rate.

S40. The interaction device 21 informs the UE 1 of the new recommended bit rate using the I1 interface.

S41. As an alternative to steps S39 and S40, the new recommended bit rate may be injected directly in the RAN 7 in a communication towards the UE 1.

S42. The UE 1 uses the received new recommended bit rate in a request for a video segment sent to the server 14. The server 14 sends the video segment using the new recommended bit rate.

Figure 11:
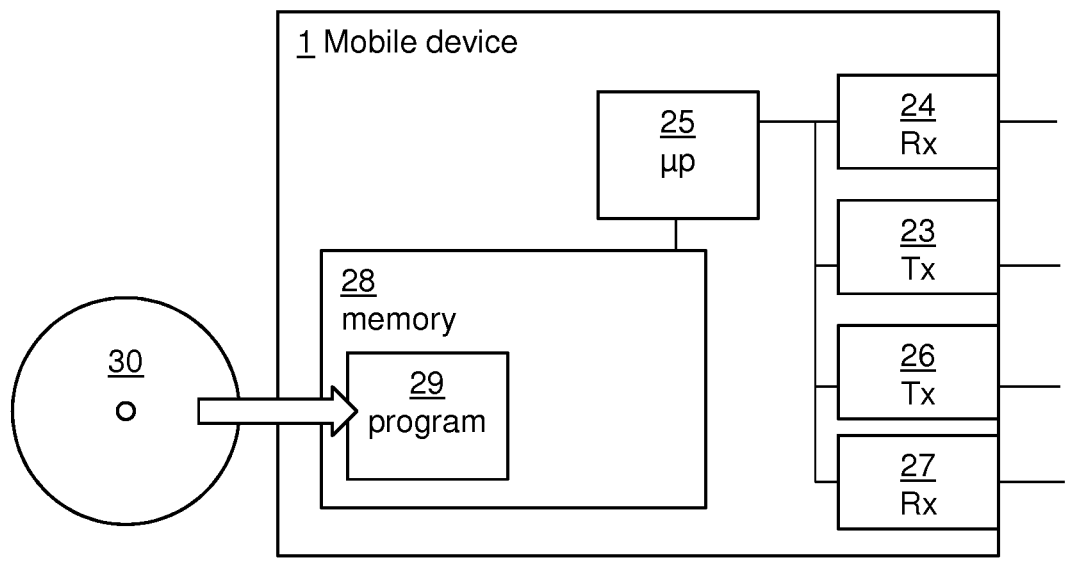
FIG. 11 illustrates schematically in a block diagram an exemplary UE.

Turning now to FIG. 11, there is illustrated a mobile device 1 such as a UE. The UE 1 is provided with a transmitter 23 arranged to send information relating to the service (such as the type of service, the type of service delivery parameters required) to the interaction device 21, and request information relating to the RAN 7. This information may be the recommended service delivery parameter or information allowing the UE 1 to determine the service delivery parameter. A receiver 24 is provided, arranged to receive the requested information from a remote device (the interaction device 21 or a device in the RAN 7). A processor 25 is arranged to use the received information to determine the required service delivery parameter relating to delivery of the service from the server 14 to the UE 1. A second transmitter 26 is arranged to send a request for data towards the server 14, the request including the determined service delivery parameter. A second receiver is 27 arranged to receive from the server 14 data sent using the service delivery parameter.

A non-transitory computer readable medium in the form of a memory 28 may be provided. This may be used to store a program 29 which, when executed by the processor, causes the UE 1 to behave as described above. The program 29 may alternatively be provided via another medium 30, such as an external storage medium, an electronic signal, optical signal, radio signal, or non-transitory computer readable storage medium.

Note that the transmitters and receivers described above may be physically implemented in any suitable configuration (for example, a single transceiver, a single transmitter that performs the functions of both the first and second transmitters, and so on).

Figure 12:
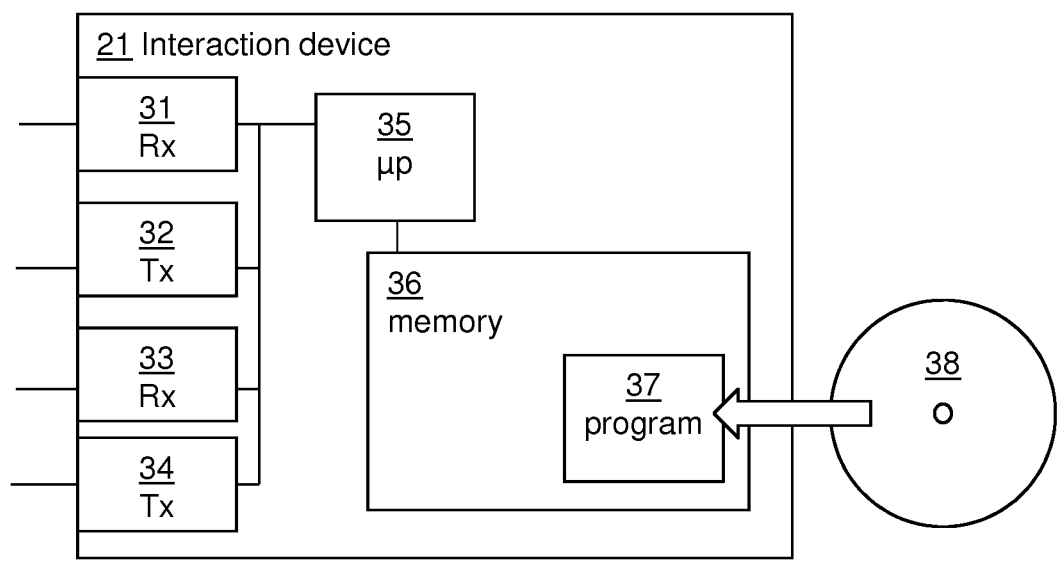
FIG. 12 illustrates schematically in a block diagram and exemplary interaction device.

FIG. 12 illustrates an exemplary interaction device 21, which is provided with a first receiver 31 arranged to receive from the UE 1 information relating to the service and a request for information relating to the RAN 7. A first transmitter 32 is arranged to send a message to a remote device in the RAN 7, the message including the information relating to the service. A second receiver 33 is arranged to receive a recommended service delivery parameter relating to delivery of the service from a server 14 to the UE 1. A second transmitter 34 is arranged to send the recommended service delivery parameter towards the UE 1. The signalling is controlled by a processor 35.

A non-transitory computer readable medium in the form of a memory 36 may be provided. This may be used to store a program 37 which, when executed by the processor 35, causes the interaction device 21 to behave as described above. The program 37 may alternatively be provided via another medium 38, such as an external storage medium, an electronic signal, optical signal, radio signal, or non-transitory computer readable storage medium.

Note that the transmitters and receivers described above may be physically implemented in any suitable configuration (for example, a single transceiver, a single transmitter that performs the functions of both the first and second transmitters, and so on).

Figure 13:
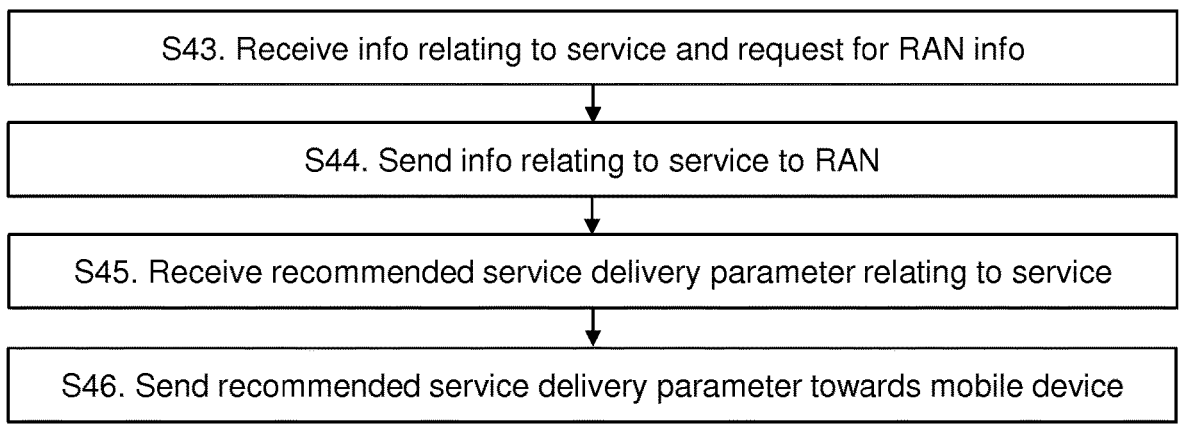
FIG. 13 is a flow diagram showing exemplary steps at an interaction device.

Exemplary steps for the interaction device 21 are shown in FIG. 13, with the following numbering corresponding to that of FIG. 13:

S43. The interaction device 21 receives information relating to the service and a request for information relating to a RAN to which the UE 1 is attached.

S44. A message is sent to a remote device in the RAN 7, the message including information relating to the service;

S45. In response, the interaction device 21 receives a recommended service delivery parameter relating to delivery of the service from a server 14 to the UE 1.

S46. The interaction device sends the recommended service delivery parameter towards the UE 1.

Figure 14:
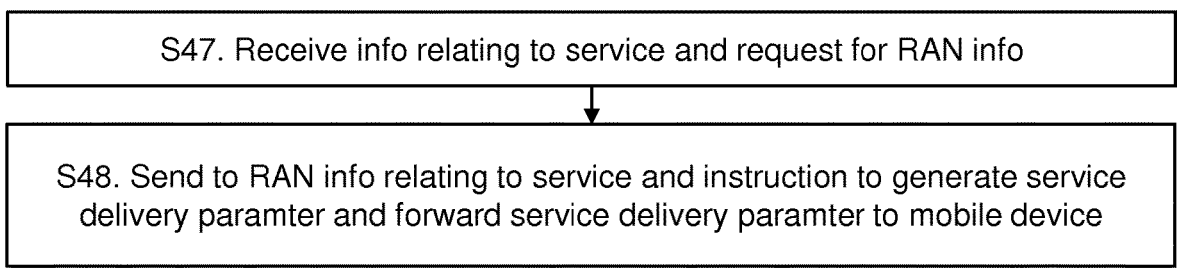
FIG. 14 is a flow diagram showing alternative exemplary steps at an interaction device.

FIG. 14 shows exemplary steps at the interaction device in the embodiment in which the RAN sends the recommended service delivery parameter directly to the UE 1. The following numbering corresponds to that of FIG. 14:

S47. The interaction device 21 receives information relating to the service and a request for information relating to a RAN to which the UE 1 is attached.

S48. A message is sent to a remote device in the RAN 7, the message including information relating to the service and an instruction to generate a recommended service delivery parameter and forward the generated recommended service delivery parameter to the UE 1.

Figure 15:
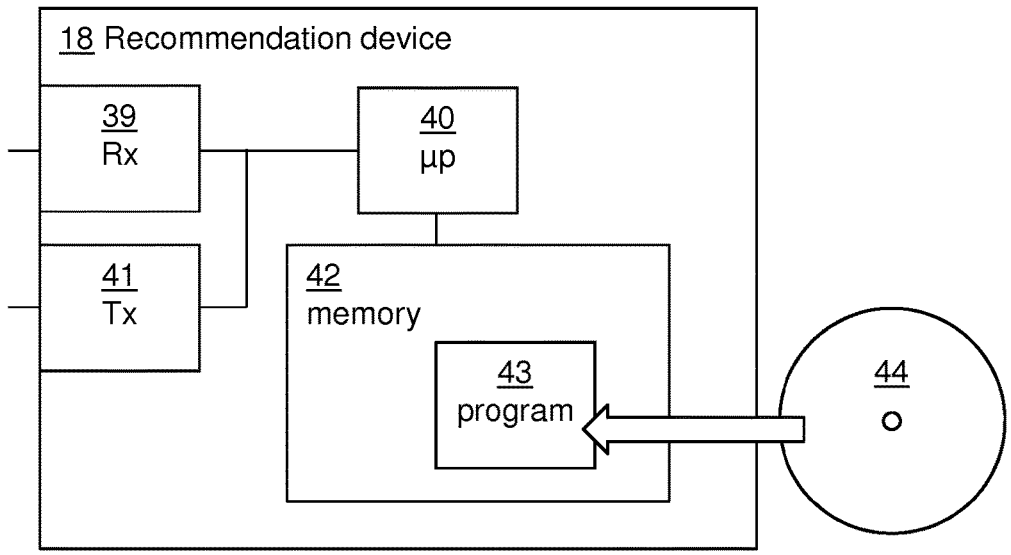
FIG. 15 illustrates schematically in a block diagram an exemplary recommendation device.

FIG. 15 illustrates a recommendation device 18, which is provided with a receiver 39 arranged to receive from an interaction device 21 information relating to the service and a request to provide a recommendation for the service delivery parameter. A processor 40 is arranged to determine a recommended service delivery parameter. A transmitter 41 is arranged to send the recommended service delivery parameter to either the interaction device 21 or the UE 1.

A non-transitory computer readable medium in the form of a memory 42 may be provided. This may be used to store a program 43 which, when executed by the processor 40, causes the recommendation device 18 to behave as described above. The program 43 may alternatively be provided via another medium 44, such as an external storage medium, an electronic signal, optical signal, radio signal, or non-transitory computer readable storage medium.

Note that the transmitter and receiver described above may be physically implemented in any suitable configuration, such as a single transceiver.

Figure 16:
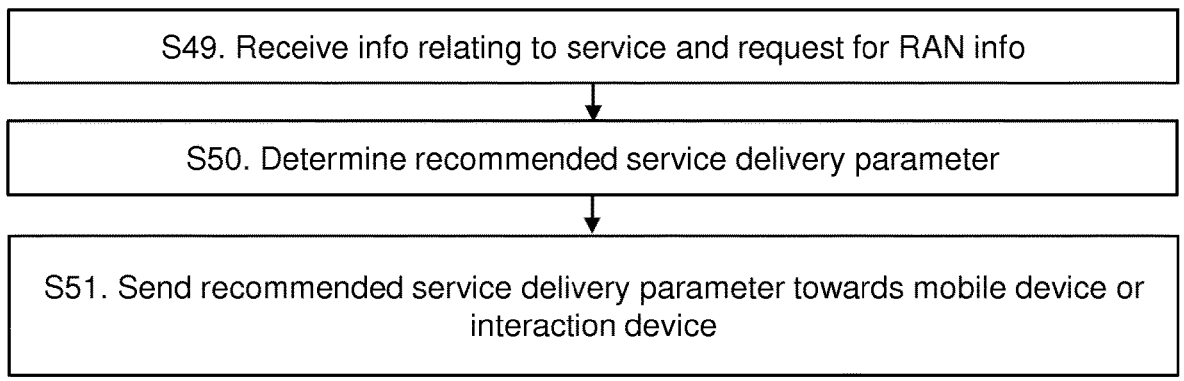
FIG. 16 is a flow diagram showing exemplary steps at a recommendation device.

Exemplary steps at the recommendation device 18 are shown in FIG. 16, with the following numbering corresponding to that of FIG. 16:

S49. The recommendation device 18 receives, from the interaction device 21, information relating to the service and a request to provide a recommendation for a service delivery parameter.

S50. A recommended service delivery parameter is determined based on the type of service, conditions and capabilities of the network and so on, as described above.

S51. The recommended service delivery parameter is sent towards either the UE 1 or the interaction device for forwarding to the UE 1.

The techniques described above improve the end user QoE by ensuring that a suitable service delivery parameter is used for delivered data using feedback about conditions/capabilities in the RAN. Note that other factors may be taken into account, such as a level of a user's subscription; for example, a user with a high priority level type of subscription may be able to stream video at a higher resolution than a user with a lower level of subscription. The interaction between the UE 1 and the interaction device 21 supports this without impacting the server providing the data. Except for the example of FIG. 10, there is no relation required between the service provider and the operator, which is a large advantage since the number of service providers and mobile operators is quite large.

Furthermore, by providing a direct interface between the UE 1 and the interaction device 21, a fast communication channel between the UE 1 and the interaction device 21 is provided that provides a faster feedback about suitable bit rate to use.

It will be appreciated by the person of skill in the art that various modifications may be made to the above-described embodiments without departing from the scope of the present invention. For example, any type of service delivery parameter may be used. Furthermore, the same principles can be adapted to any type of network where a device accesses a communications network using a RAN.

The following abbreviations have been used in the above description:
AC Access Controller
AP Access Point
eNB eNodeB
NAT Network Address Translation
OS Operating System
PGW Packet Data Network Gateway
QoE Quality of Experience
RAN Radio Access Network
RAT Radio Access Technology
RTT round trip time
RNC Radio Network Controller
SGW Serving Gateway
TCP Transmission Control Protocol
UDP User Datagram Protocol
UE User Equipment

The invention claimed is:

1. A method of requesting delivery of video data in a communication network, the method, at a mobile device, comprising:

establishing, via a Radio Access Network, a connection with a server for a session to obtain the video data from the server;

establishing a separate connection with an interaction device by use of an interaction client of the mobile device, wherein the interaction client allows the mobile device to obtain and use service delivery parameters;

sending, by the interaction client, to the interaction device located external to the mobile device, information relating to the delivery of the video data and requesting the interaction device to interact with the Radio Access Network to communicate information relating to the Radio Access Network which communicates wirelessly with the mobile device;

in response to sending the information relating to the delivery of the video data to the interaction device, receiving, from a remote device located in the Radio Access Network, the information relating to the Radio Access Network, wherein the information relating to the Radio Access Network is injected as data onto user plane traffic of the established connection between the mobile device and the server by the remote device in the Radio Access Network;

using the received information relating to the Radio Access Network, establishing, at the mobile device, a service delivery parameter relating to the delivery of the video data from the server to the mobile device;

sending towards the server a request for the video data, the request including the service delivery parameter to be applied to the delivery of the video data; and receiving, from the server, the video data sent using the service delivery parameter in response to the request for the video data.

2. The method according to claim 1, wherein the information relating to the Radio Access Network comprises capabilities of the communication network or conditions in the communication network, or both capabilities of the communication network and conditions in the communication network.

3. The method according to claim 1, wherein the service delivery parameter includes any of a recommended frame size, a recommended bit rate, a recommended image resolution, a recommended image size, and buffer parameters.

4. The method according to claim 1, wherein an application client at the mobile device to handle the video data.

5. The method according to claim 1, wherein the information relating to the Radio Access Network is received using any of a protocol based on any of HTTP and Websocket, and a protocol using any of User Datagram Protocol and Transmission Control Protocol as a transport mechanism.

6. The method according to claim 1, further comprising receiving the information periodically or in response to a further request sent by the mobile device, or both periodically and in response to the further request sent by the mobile device.

7. A method of providing a service delivery parameter in a communication network for delivery of video data, the method performed in a Radio Access Network comprising:

receiving, from a mobile device which communicates wirelessly with the Radio Access Network, a signal to establish a connection with a server for a session to obtain the video data from the server;

establishing the connection;

receiving, from an interaction device located external to the mobile device, a request for information relating to the Radio Access Network, wherein the request for the information relating to the Radio Access Network from the interaction device is in response to an interaction client of the mobile device communicating with the interaction device in a separate connection relating to the delivery of the video data and for the interaction device to interact with the Radio Access Network, in order for the interaction client to use the information relating to the Radio Access Network to allow the mobile device to obtain and use a service delivery parameter relating to the delivery of the video data;

in response to receiving the request from the interaction device, generating in a recommendation device in the Radio Access Network, the information relating to the Radio Access Network; and sending, from the recommendation device, the information relating to the Radio Access Network towards the mobile device, by injecting the information relating to the Radio Access Network onto user plane traffic of the established connection between the mobile device and the server, in order for the mobile device to generate the service delivery parameter for the delivery of the video data.

8. The method according to claim 7, wherein the service delivery parameter includes any of a recommended frame size, a recommended bit rate, a recommended image resolution, a recommended image size, and buffer parameters.

9. A mobile device for use in a communication network to request delivery of video data, the mobile device comprising:

a transmitter to send a signal, via a Radio Access Network, to establish a connection with a server for a session to obtain the video data from the server and to establish a separate connection with an interaction device by use of an interaction client of the mobile device, wherein the interaction client allows the mobile device to obtain and use service delivery parameters, and wherein the interaction client to send to the interaction device located external to the mobile device, information relating to the delivery of the video data and requesting the interaction device to interact with the Radio Access Network to communicate information relating to the Radio Access Network which communicates wirelessly with the mobile device;

a receiver to receive, from a remote device located in the Radio Access Network in response to sending the information relating to the delivery of the video data to the interaction device, the information relating to the Radio Access Network, wherein the information relating to the Radio Access Network is injected as data onto user plane traffic of the established connection between the mobile device and the server by the remote device in the Radio Access Network;

a processor to use the received information relating to the Radio Access Network, to establish, at the mobile device, a service delivery parameter relating to delivery of the video data from the server to the mobile device;

wherein the transmitter to send towards the server a request for the video data, the request including the service delivery parameter to be applied to the delivery of the video data; and wherein the receiver to receive, from the server, the video data sent using the service delivery parameter in response to the request for the video data.

10. The mobile device according to claim 9, further comprising an application client to handle the video data.

11. A non-transitory computer-readable storage medium storing instructions which, when executed by at least one processor of a mobile device, cause the mobile device in a communication network to request delivery of video data by performing operations comprising:

establishing, via a Radio Access Network, a connection with a server for a session to obtain the video data from the server;

establishing a separate connection with an interaction device by use of an interaction client of the mobile device, wherein the interaction client allows the mobile device to obtain and use service delivery parameters;

sending, by the interaction client, to the interaction device located external to the mobile device, information relating to the delivery of the video data and requesting the interaction device to interact with the Radio Access Network to communicate information relating to the Radio Access Network which communicates wirelessly with the mobile device;

in response to sending the information relating to the delivery of the video data to the interaction device, receiving, from a remote device located in the Radio Access Network, the information relating to the Radio Access Network, wherein the information relating to the Radio Access Network is injected as data onto user plane traffic of the established connection between the mobile device and the server by the remote device in the Radio Access Network;

using the received information relating to the Radio Access Network, establishing, at the mobile device, a service delivery parameter relating to the delivery of the video data from the server to the mobile device;

sending towards the server a request for the video data, the request including the service delivery parameter to be applied to the delivery of the video data; and receiving, from the server, the video data sent using the service delivery parameter in response to the request for the video data.

12. The non-transitory storage medium according to claim 11, wherein the information relating to the Radio Access Network comprises capabilities of the communication network or conditions in the communication network, or both capabilities of the communication network and conditions in the communication network.

13. The non-transitory storage medium according to claim 11, wherein the service delivery parameter includes any of a recommended frame size, a recommended bit rate, a recommended image resolution, a recommended image size, and buffer parameters.

14. The non-transitory storage medium according to claim 11, wherein an application client at the mobile device to handle the video data.

15. The non-transitory storage medium according to claim 11, wherein the information relating to the Radio Access Network is received using any of a protocol based on any of HTTP and Websocket, and a protocol using any of User Datagram Protocol and Transmission Control Protocol as a transport mechanism.

16. The non-transitory storage medium according to claim 11, further comprising receiving the information periodically or in response to a further request sent by the mobile device, or both periodically and in response to the further request sent by the mobile device.

17. A non-transitory computer-readable storage medium storing instructions which, when executed by at least one processor, cause a Radio Access Network in a communication network to perform operations for delivery of video data comprising:

receiving, from a mobile device which communicates wirelessly with the Radio Access Network, a signal to establish a connection with a server for a session to obtain the video data from the server;

establishing the connection;

receiving, from an interaction device located external to the mobile device, a request for information relating to the Radio Access Network, wherein the request for the information relating to the Radio Access Network from the interaction device is in response to an interaction client of the mobile device communicating with the interaction device in a separate connection relating to a delivery of the video data and for the interaction device to interact with the Radio Access Network, in order for the interaction client to use the information relating to the Radio Access Network to allow the mobile device to obtain and use a service delivery parameter relating to the delivery of the video data;

in response to receiving the request from the interaction device, generating in a recommendation device in the Radio Access Network, the information relating to the Radio Access Network; and sending, from the recommendation device, the information relating to the Radio Access Network towards the mobile device, by injecting the information relating to the Radio Access Network onto user plane traffic of the established connection between the mobile device and the server, in order for the mobile device to generate the service delivery parameter for the delivery of the video data.

18. The non-transitory storage medium according to claim 17, wherein the service delivery parameter includes any of a recommended frame size, a recommended bit rate, a recommended image resolution, a recommended image size, and buffer parameters.

* * * * *